(12) United States Patent
McGranahan et al.

(10) Patent No.: US 9,541,149 B2
(45) Date of Patent: Jan. 10, 2017

(54) TRANSLATIONAL TUNED MASS DAMPER WITH CONTINUOUSLY ADJUSTABLE DAMPING CHARACTERISTICS FOR APPLICATION TO HIGH SPEED WIND TUNNEL TESTING

(71) Applicant: The Boeing Company, Chicago, IL (US)

(72) Inventors: Bryan David McGranahan, St. Peters, MO (US); Mathew Lee Rueger, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/477,701

(22) Filed: Sep. 4, 2014

(65) Prior Publication Data

US 2016/0069409 A1  Mar. 10, 2016

(51) Int. Cl.
| | | |
|---|---|---|
| *F16F 7/104* | (2006.01) | |
| *G01M 9/04* | (2006.01) | |
| *F16F 9/34* | (2006.01) | |
| *F16F 7/116* | (2006.01) | |
| *F16F 15/02* | (2006.01) | |

(52) U.S. Cl.
CPC .............. *F16F 7/104* (2013.01); *F16F 7/116* (2013.01); *F16F 9/34* (2013.01); *F16F 15/022* (2013.01); *G01M 9/04* (2013.01)

(58) Field of Classification Search
CPC ............ F16F 7/10; F16F 7/1017; F16F 7/112; F16F 7/116; G01L 25/00; G01M 9/00; G01M 9/02; G01M 9/04; G01M 9/08

USPC ........................ 188/379, 380; 73/118.03, 147
See application file for complete search history.

(56) References Cited

U.S. PATENT DOCUMENTS

| | | | | |
|---|---|---|---|---|
| 2,819,775 A | * | 1/1958 | Everett ........................ | 188/378 |
| 2,854,100 A | * | 9/1958 | Oiley et al. .................. | 188/379 |
| 3,173,514 A | * | 3/1965 | Tiedemann ................... | 188/378 |

(Continued)

FOREIGN PATENT DOCUMENTS

| | | | |
|---|---|---|---|
| DE | 1039851 B | * | 9/1958 |
| DE | 3316177 A1 | | 11/1984 |

(Continued)

OTHER PUBLICATIONS

Superflow Technology Group, Service Procedure: Airflow Basics, 2007, retrieved from the Internet on Jul. 7, 2014 from http://www.superflow.com/support/supportDocuments/airflow_basics.pdf, 6 pages.

(Continued)

*Primary Examiner* — Thomas J Williams
(74) *Attorney, Agent, or Firm* — Kolisch Hartwell, P.C.

(57) ABSTRACT

A system, including methods and apparatus, of tuning a mass-damping apparatus to reduce dynamics forces on a wind tunnel model during wind tunnel testing. The mass-damping apparatus is coupled to a wind tunnel model and may comprise first and second pressure chambers containing a gas, a mass configured to move back and forth between the pressure chambers in a substantially airtight manner and thereby to alter gas pressure within each pressure chamber, at least one spring configured to exert a position-dependent force upon the mass, and a passageway configured to allow the gas to pass between the chambers.

20 Claims, 4 Drawing Sheets

(56) References Cited

U.S. PATENT DOCUMENTS

| | | | | |
|---|---|---|---|---|
| 3,514,054 | A | * | 5/1970 | Mard .................... B64C 27/001 188/268 |
| 3,572,112 | A | * | 3/1971 | Igoe ........................ G01M 9/04 188/266 |
| 3,934,535 | A | * | 1/1976 | Culver .......................... 114/124 |
| 4,660,689 | A | * | 4/1987 | Hayashi et al. ......... 188/322.13 |
| 5,558,191 | A | * | 9/1996 | Lai .......................... F16F 1/387 188/379 |
| 2003/0177825 | A1 | * | 9/2003 | Gibson .................. G01M 9/08 73/147 |

FOREIGN PATENT DOCUMENTS

| | | | |
|---|---|---|---|
| GB | 468365 | A * | 6/1937 |
| GB | 539720 | A * | 9/1941 |
| GB | 771663 | A | 4/1957 |
| JP | 60174924 | A * | 9/1985 |
| WO | 9842998 | A2 | 10/1998 |
| WO | 9842998 | A3 | 10/1998 |

OTHER PUBLICATIONS

Maurer Söhne, "Maurer Tuned Mass and Viscous Dampers" dated Jul. 29, 2011, retrieved from the Internet on Jul. 7, 2014 from http://www.maurersoehne.com/files/bauwerkschutzsysteme/pdf/en/brochure/MAURER_Tuned_Mass_and_Viscous_Dampers.pdf, 32 pages.

Wikipedia, Dampening, last modified Jun. 15, 2014, retrieved from Internet on Jul. 7, 2014 from http://en.wikipedia.org/wiki/Damping, 8 pages.

European Patent Office, Extended European Search Report in European Patent Application No. 15179083.9-1557, dated Feb. 8, 2016, 9 pages.

Superflow Technologies Group, Airflow Basics Service Procedure, URL: http://www.superflow.com/support/supportDocuments/airflow_basics.pdf, 2000, 6 pages.

Ogilvy, Fergus, "How Renault F1 Won a World Championship by Creating the Tuned Mass Damper", URL: http://mooregoodink.com/how-renault-f1-found-faster-lap-times-and-won-a-world-championship-by-creating-the-tuned-mass-damper/, Nov. 4, 2013, 3 pages.

* cited by examiner

TRANSLATIONAL TUNED MASS DAMPER WITH CONTINUOUSLY ADJUSTABLE DAMPING CHARACTERISTICS FOR APPLICATION TO HIGH SPEED WIND TUNNEL TESTING

INTRODUCTION

Aerodynamic testing of models in wind tunnels is a common and important part of the aeronautics industry. Accurate testing is necessary for safety, and can potentially save millions of dollars by eliminating real-world test flights. An inherent complication of wind tunnel testing is the introduction of experimental artifacts that would not be present in a real-world setting. Such artifacts include the forces exerted on a model during testing that arise from the support structure that is holding the model in place. These forces would obviously not be present on a real-world aircraft, and can interfere with any efforts to measure the forces on the model that arise from the aerodynamic performance of the model itself.

One solution to the problem of undesirable artifact forces is to reduce the dynamic pressure of the wind tunnel and hence the wind speed. This solution has the disadvantage of increasing the chance of scale effects in the wind tunnel data. A second solution is to build extra stiffness into the support structure, thus decreasing vibrations of the support structure and the associated forces on the model from the support structure. This is usually done by increasing the balance capacity and the size of the support. However, increasing the balance capacity would tend to decrease the sensitivity of the tests, and increasing the size of the support would take the model farther away from the reality it is trying to replicate, both undesirable effects. A third solution is to avoid test conditions that would give rise to unsteady aerodynamic phenomena, such as wing drop or buffet, which can excite the natural vibrational modes of the support structure. This is the worst of the three solutions, because the results of tests under such conditions are often of great interest to the end users of the wind tunnel data.

A mass-damping apparatus, or mass damper, can effectively increase the damping of a wind tunnel support system without a need for reducing wind tunnel dynamic pressure, increasing stiffness of the support, or avoiding conditions that would give rise to unsteady aerodynamic phenomena. Generally speaking, a mass damper is a damped oscillator that can be coupled to a wind tunnel model. The natural frequency of the oscillator can be chosen to coincide with a natural frequency of an undesirable artifact vibration of the wind tunnel support, which allows coupling of the motion of the damper mass with that of the wind tunnel support. This coupling enables the mass damper to influence the wind tunnel support system by replacing a single oscillatory mode with low damping with a coupled wind tunnel support/mass damper oscillation with higher damping. An optimal damping coefficient of the mass damper exists that maximizes the effect of the mass damper on the wind tunnel support. The value of optimal damping coefficient is dependent on wind tunnel support hardware, and is determined by analysis.

Existing mass dampers typically rely on friction or viscous forces to provide damping. In either case, the degree of damping may be difficult or impossible to adjust, at least without significant disassembly of the damper. For example, in mass dampers that use oil as a damping medium, to change the damping coefficient one must change the kind of oil being used, a potentially messy and time-consuming process. As a result, it may not always be possible, or at least practical, to achieve optimal damping, particularly if the damper is designed to have a variable natural frequency. In addition, friction-based dampers can experience undesirable wear at the frictional surfaces, and viscous dampers can develop leaks that affect the damping force and can damage the damper's surroundings.

SUMMARY

Systems and methods of the present disclosure relate to mass dampers with adjustable damping characteristics for application to high speed wind tunnel testing, where "high speed" refers to dynamic pressure of approximately 25 pounds per square foot or more. More specifically, an embodiment of a mass-damping apparatus according to the present disclosure may be coupled to a wind tunnel model to damp vibrations of the model during wind tunnel testing. The present disclosure further relates to tunable mass dampers that can use air or any fluid as a damping medium. This provides several advantages over other known mass dampers, including the degree to which the presently disclosed mass dampers may be tuned for a specific application, and the possibility of using air as a damping medium.

A mass-damping apparatus according to the present teachings is tunable in at least two senses. First, the frequency at which it will absorb energy most readily is adjustable, and can be chosen to match a natural vibrational frequency of the support structure, the model itself, a combination of the two, or any other frequency that is causing undesirable artifacts in the wind tunnel data. Second, the amount of damping can be adjusted continuously merely by turning a valve or with some other similarly convenient adjustment mechanism. Adjusting the damping coefficient by regulating the flow of the damping medium through a continuously adjustable valve is relatively simple and quick, resulting in a greater likelihood of achieving optimal damping at any given frequency of oscillation.

A tunable mass damper according to the present teachings allows wind tunnel testing to be accomplished over an expanded range of angles and test speeds, including when a model has undesirable aerodynamic behavior. This will reduce risk to the model, the test facility, and the test program itself by allowing data to be acquired at test conditions that otherwise would be unattainable, potentially saving several test flights per program.

A mass-damping apparatus according to the present teachings may comprise first and second pressure chambers containing a gas, a mass configured to move back and forth between the pressure chambers in a substantially airtight manner and thereby to alter gas pressure within each pressure chamber, at least one spring configured to exert a position-dependent force upon the mass, and a passageway configured to allow the gas to pass between the chambers at a controllable rate. An embodiment of a mass-damping apparatus may be used as part of a method to reduce dynamic forces on a wind tunnel model during testing. An embodiment of a mass-damping apparatus may be tuned to reduce dynamic forces on a wind tunnel model during testing.

DETAILED DESCRIPTION

The present disclosure generally relates to a mass damper that may be coupled to a scale model airplane or other object, typically during wind tunnel testing, to help prevent undesirable vibrations of the model at various natural frequencies of the testing system. More specifically, the present teachings relate to mass dampers that may include a mass configured to move between two pressure chambers, and a fluid passageway connecting the two chambers. In some cases, airflow (or fluid flow) through the passageway may be controlled by an adjustable valve, providing a degree of adjustability not found in previously known mass dampers. Methods and apparatus according to the present teachings may be particularly suitable for use in high speed wind tunnel testing, where dynamic pressure reaches 25 pounds per square foot or more.

Figure 1:
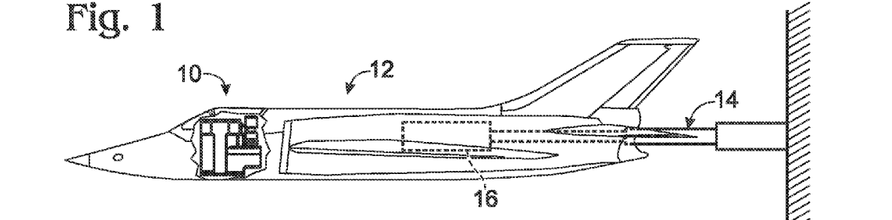
FIG. 1 is a semi-transparent side elevational view depicting a mass-damping apparatus disposed within an airplane model, according to aspects of the present teachings.

FIGS. 1-4 depict various aspects and embodiments of mass dampers according to the present teachings. FIG. 1 is semi-transparent side elevational view depicting an embodiment of a mass-damping apparatus or mass damper, generally indicated at 10, showing how the mass damper may be disposed within and/or attached to an airplane or other model 12 according to the present teachings. Mass damper 10 may be used to decrease vibrations of model 12 and/or a support structure 14 that supports model 12 during wind tunnel testing of the model. Mass-damping apparatus 10 may be coupled to model 12, for example, with screws, bolts, adhesives, press fitting, or by any other suitable means.

Model 12 may be connected to an internal balance 16, which may be the primary measurement device used in wind tunnel testing to determine the motions of the model as a function of time. Internal balance 16 also may be connected to support structure 14, which supports the model during testing. In some cases, the natural vibrational frequencies of model 12 and/or support structure 14 may be known exactly or nearly exactly, and mass-damping apparatus 10 may be pre-configured or tuned to dampen least some of the associated vibrations. In other cases, the natural frequencies of the system may be unknown or known only approximately, in which case it may be desirable to adjust or "tune" the mass damper during aerodynamic testing, until it damps vibrations at one or more desired frequencies. This can be accomplished by adjusting various parameters of the mass damper, as described in more detail below.

In any event, when mass damper 10 is adjusted to reduce or prevent vibrations of model 12 that arise from the coupling of the model with support structure 14, this allows internal balance 16 to measure only (or primarily) vibrations associated with the actual aerodynamic performance of the model, thus improving the accuracy and utility of the wind tunnel testing.

Figure 2:
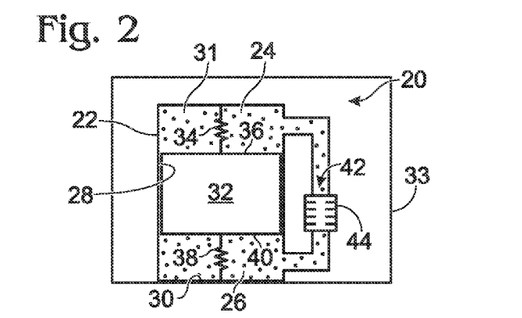
FIG. 2 is a schematic illustration of a mass-damping apparatus of the present disclosure.

FIG. 2 is a schematic elevational view depicting a simplified mass damper, generally indicated at 20, illustrating some of the basic features and elements of a mass damper according to the present teachings. Mass damper 20 includes a housing 22 that defines first and second pressure chambers 24, 26, a cylindrical central portion 28 between the first and second pressure chambers, and a mounting base 30 configured to couple the housing to a wind tunnel model. The model is indicated schematically as an arbitrary box 33 inside of which the mass damper has been attached. The first and second pressure chambers 24 and 26 may contain a gas 31, such as air, or any other compressible gas or fluid. The term "atmospheric air" may sometimes be used in this disclosure to indicate ordinary air taken from the environment.

A mass 32 fits into cylindrical central portion 28 in an airtight or substantially airtight manner. Mass 32 can move back and forth in the central portion between the two pressure chambers 24 and 26, thus altering the gas pressure within each pressure chamber 24 and 26. Mass-damping apparatus 20 includes a first spring 34 configured to exert a position-dependent force upon a first side 36 of mass 32, and a second spring 38 configured to exert a position-dependent force upon a second side 40 of mass 32. The first side 36 may be substantially opposite the second side 40 of mass 32. In other embodiments, a mass damper according to the present teachings may include only one spring, or may include one or more alternative elements configured to exert position-dependent forces upon mass 32, such as elastomers, struts, or the like.

A passageway 42 connects the first and second pressure chambers 24, 26, and is configured to allow gas 31 to pass between the two chambers, thereby altering the pressures in each chamber. A valve 44 is configured to control the rate of gas or fluid flow through passageway 42. Valve 44 may, for example, contain a plurality of apertures configured to be incrementally opened and closed as the valve is adjusted, thereby controlling the rate of flow through the passageway.

In the absence of any damping forces, once set in motion mass 32 would oscillate between pressure chambers 24 and 26 indefinitely at its natural frequency, in an example of undamped motion. However, the pressures within the pressure chambers provide a variable, velocity-dependent damping force, causing the oscillations of mass 32 to decay or in some cases even preventing oscillations.

In other words, mass damper 20 can be configured to cause mass 32 to undergo underdamped motion (where in the absence of additional forces, the mass would undergo more than one oscillation before coming to rest), critically damped motion (where in the absence of additional forces, the mass would return to equilibrium as quickly as possible without oscillating), or overdamped motion (where in the absence of additional forces, the mass would return to equilibrium without oscillating, but in a longer time than if critically damped). The characterization and mathematical treatment of these various types of damped oscillations are well know and will not be described in further detail in this disclosure.

The natural frequency of apparatus 20 can be adjusted by changing the mass and/or changing the springs (i.e., changing the effective spring constant). In addition, for a given natural frequency, the degree to which oscillations of the mass are damped can be adjusted by regulating the rate of flow through the passageway connecting the pressure chambers, which changes the damping force. In particular, adjustment of valve 44 changes the pressure-induced damping forces and thereby allows convenient control over the amount of damping provided by mass damper 20, without requiring any significant disassembly of the apparatus.

Figure 3:
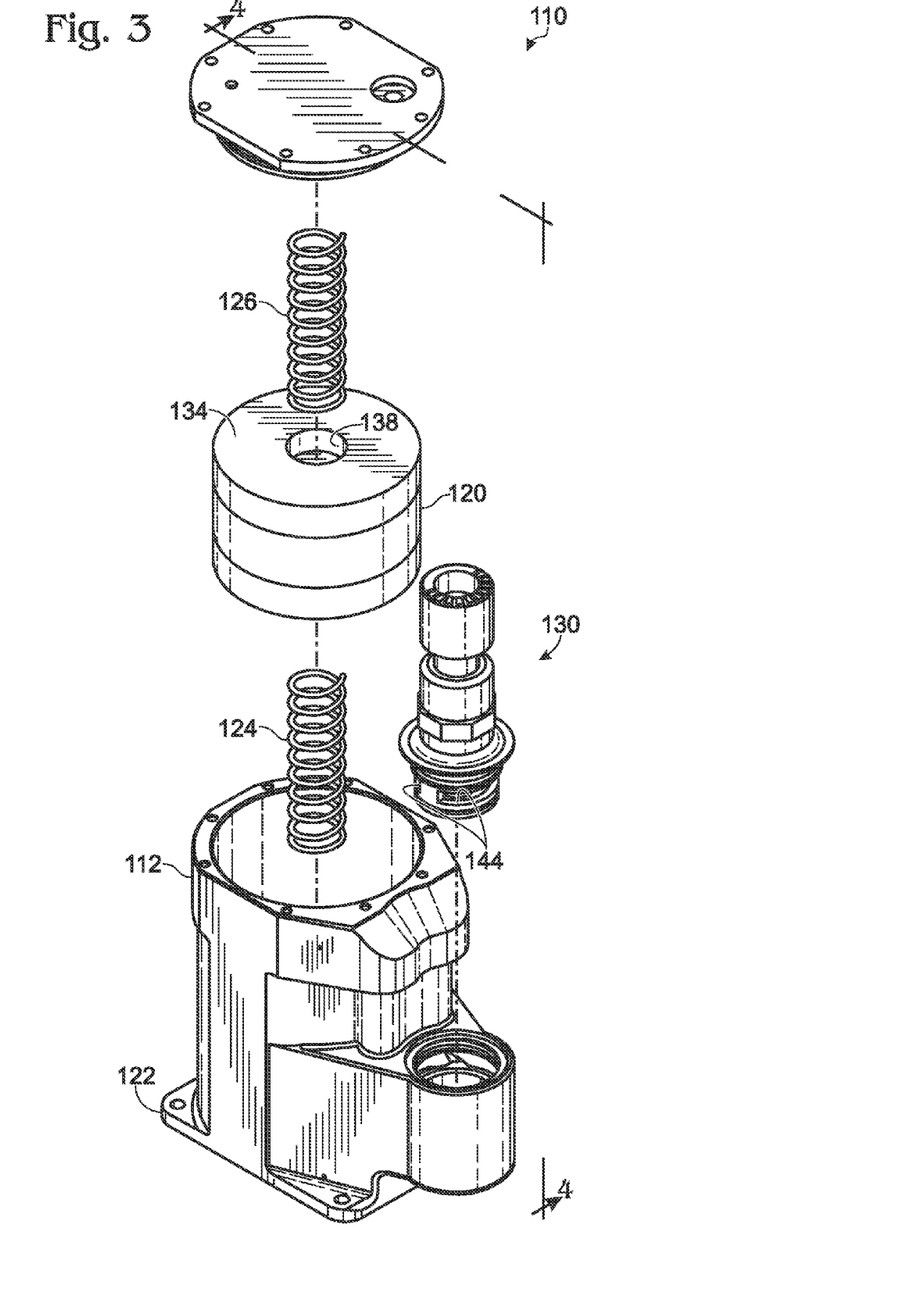
FIG. 3 is an exploded view depicting an embodiment of a mass-damping apparatus, according to aspects of the present teachings.
Figure 4:
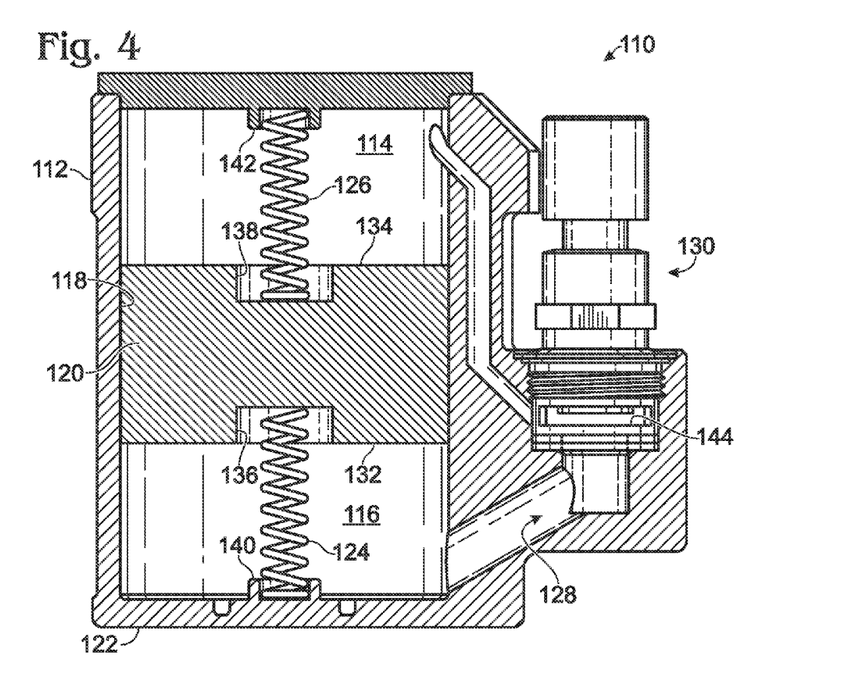
FIG. 4 shows an unexploded cross-sectional view of the embodiment of the mass-damping apparatus of FIG. 3, taken at plane 4-4 in FIG. 3.

FIG. 3 is an exploded isometric view, and FIG. 4 is an assembled sectional view taken through the plane 4-4 in FIG. 3, depicting another embodiment of a mass-damping apparatus according to the present teachings, generally indicated at 110. Mass-damping apparatus 110, which also may be referred to simply as a mass damper, includes a housing 112 that defines a first pressure chamber 114, a second pressure chamber 116, a cylindrical central portion 118 between the first and second pressure chambers for receiving a mass 120, and a mounting base 122 configured to couple housing 112 to a wind tunnel model. A first spring 124 and a second spring 126 are provided and configured to exert position-dependent forces on mass 120, and a passageway 128 is configured to allow a gas to pass between the chambers. A valve 130 is configured to control a rate of gas flow through passageway 128.

The working fluid in mass damper 110 may be ordinary atmospheric air, or it may be any other gas or fluid chosen based on properties such as compressibility, cost, and ease of use, among others. Further, while mass damper 110, and particularly central portion 118 of the mass damper, are depicted in FIGS. 3-4 as substantially cylindrical in shape, more generally a mass damper according to the present teachings may have any desired shape configured to allow a central mass to move back and forth between two pressure chambers. Similarly, the central mass may have any desired shape that can fit within a central portion of the mass damper in a substantially airtight manner. For example, a spherical mass might be used within a cylindrical housing.

Mass damper 110 may be configured so that mass 120 can be conveniently adjusted, either by adding additional sections of mass to an existing section, or by allowing replacement of the mass and selecting a mass with a desired density or weight. In some cases, mass 120 may be chosen to have a weight which is some desired fraction or percent of the weight of the wind tunnel model to be tested. For example, mass 120 may be chosen to have a weight in the range of 0.5%-10% of the weight of the wind tunnel model, or more specifically in the range of 1%-3% of the weight of the wind tunnel model.

Spring 124 is configured to exert a force on a first side 132 of mass 120, and spring 126 is configured to exert a force on a second side 134 of mass 120 which is substantially opposite the first side. In some embodiments, springs 124 and 126 are linear springs configured to exert forces upon mass 120 which are proportional to their compression or stretch relative to some equilibrium position. In other embodiments, non-linear springs or alternative force providing elements such as spring-like elastomers may be provided, and in some cases only a single spring or alternative element may be used.

In the embodiment of FIGS. 3-4, a pair of cylindrical indents 136, 138 are formed in the respective sides of mass 120 to retain one side of each spring 124, 126, and a pair of cylindrical protrusions 140, 142 are formed on the inside surfaces of the top and bottom of the mass damper to retain the other side of each spring. The indents and protrusions of mass damper 110 maintain the correct position and alignment of springs 124, 126 and also facilitate replacement of the springs, for instance for purposes of routine maintenance or when a different spring constant is desired. In other embodiments, the springs or alternative force providing elements may be aligned or retained by different methods, such as by adhesion to the mass and/or the interior of the mass damper.

Passageway 128 fluidically connects pressure chambers 114 and 116, thereby allowing air or some other working fluid to pass between the pressure chambers. Valve 130 is configured to control or regulate the rate of gas or fluid flow through the passageway, which can be accomplished in a variety of ways. For example, valve 130 may include one or a plurality of peripheral apertures 144 configured to be incrementally opened as the valve is adjusted, thereby regulating gas flow through the passageway. Alternatively, valve 130 could include a single aperture that can be incrementally opened, such an iris-type aperture with an adjustable diameter, or any other suitable mechanism for controlling the amount of air or other working fluid that can pass through the valve. In the embodiment of in FIGS. 3-4, valve 130 is depicted as a faucet valve, though a ball valve or a needle valve could be used as well. In any case, the use of a valve that regulates flow through passageway 128 allows the amount of damping force exerted on mass 120 to be conveniently adjusted to a desired level, without disassembling the mass damper.

As described previously with respect to the schematic depiction of a mass damper in FIG. 2, mass damper 110 of FIGS. 3-4 can provide any desired degree of damping to the motion of mass 120. Specifically, by adjusting the amount of the mass, the spring constant or effective spring constant of the springs, and/or the rate of flow through the passageway connecting the pressure chambers, mass 120 may be configured to oscillate at any desired frequency, and the motion of mass 120 can be underdamped, critically damped, or overdamped. Typically, but not always, it may be desirable to achieve critical damping corresponding to a particular natural frequency of vibration, which can be obtained through the appropriate selection of mass and springs. Any adjustments to the amount of damping can then be made by adjusting the flow through passageway 128 with valve 130.

Figure 5:
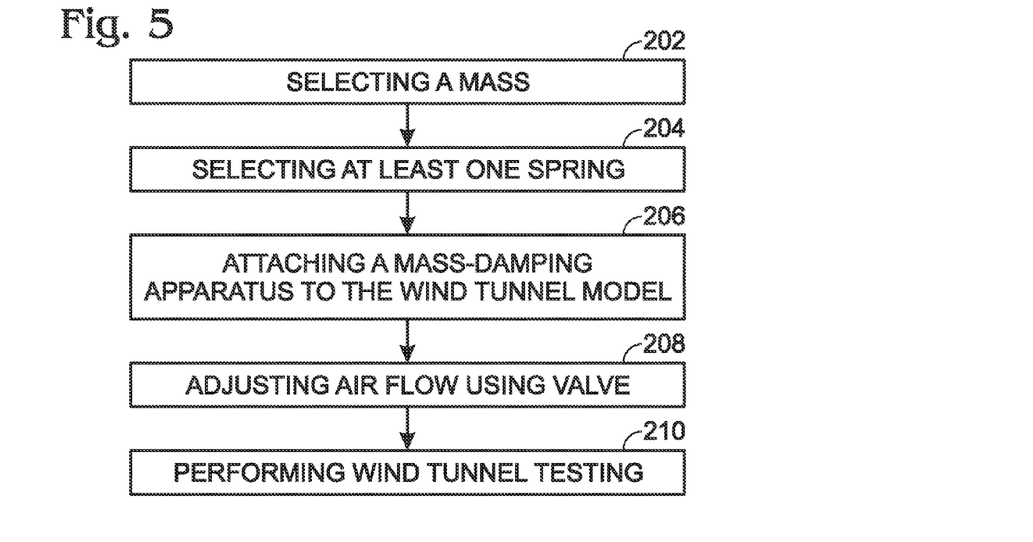
FIG. 5 is a flow chart depicting a method of reducing dynamic forces on a wind tunnel model during wind tunnel testing, according to aspects of the present disclosure.

The present disclosure also relates to methods for using a mass damper apparatus of the type described above. FIG. 5 is a flow chart depicting a method, generally indicated at 200, of reducing dynamic forces on a wind tunnel model during wind tunnel testing, according to aspects of the present disclosure.

At step 202, a mass is selected. Any suitable mass may be selected, and there may be a variety of selection criteria that determine which mass is chosen, with the ultimate goal of matching the natural frequency of the mass when used in a mass damper to a natural frequency of vibration resulting from the coupling of a model to a support structure. One possible choice is to select a mass with a weight based on or equal to a predetermined percentage of weight of a wind tunnel model. For example, the predetermined percentage may be in the range of 1 to 3 percent of the weight of the wind tunnel model, though other ranges may be chosen as well.

At step 204, at least one spring is selected. The spring may have a spring constant chosen based on a natural frequency to be damped, in combination with the mass selected at step 202. For example, the spring constant may be chosen so that a mass damper constructed from the chosen mass and spring(s) will match a natural frequency of the wind tunnel model and/or a support structure for the wind tunnel model. Selecting at least one spring may include selecting at least two springs, or any number of desired springs. When more than one spring is selected, the springs may collectively have an effective spring constant that is chosen based on one or more natural frequencies, as described above in the case of one spring.

At step 206, a mass-damping apparatus of the general type shown in FIGS. 1-4 and described previously is attached to the wind tunnel model. Accordingly, the mass-damping apparatus may include a housing containing the selected mass and the selected spring(s), with the mass received in a cylindrical central portion of the housing in between first and second pressure chambers defined by the housing on either side of the mass. As described previously, the pressure chambers may contain air or any other suitable gas or fluid. The selected mass may be configured to move back and forth in the cylindrical central portion between the pressure chambers in a substantially airtight manner, thus altering the pressure within each pressure chamber.

Also as described previously, as the mass moves back and forth, the springs or other force-providing elements will exert a position-dependent force upon the mass, directed towards an equilibrium position of the mass and increasing in magnitude as the mass moves farther away from its equilibrium position. The apparatus also may include a passageway configured to allow air or another working fluid to pass between the first and second pressure chambers. Along this passageway may be a valve configured to regulate air flow through the passageway. The valve may be adjustable by virtue of including one or a plurality of apertures that could be incrementally opened.

The housing of the mass-damping apparatus may include a mounting base configured to couple the housing to the wind tunnel model. For example, the mounting base could be attached to the model by screws, bolts, or other similar fastening hardware, although many other attachment means such as adhesive attachment are also possible.

At step 208, the air or other fluid flow through the passageway is adjusted using the valve. For example, the aperture(s) of the valve may be incrementally opened or closed, thereby incrementally increasing or decreasing the flow through the passageway that connects the pressure chambers.

At step 210, wind tunnel testing is performed on the model. Wind tunnel testing will typically include mounting the model on a support structure and directing air flow over the model. The model may be outfitted with a suite of instruments designed to measure, for example, forces on the model during testing. Some of these forces may come from the aerodynamic performance of the model and some may come from the support structure that is holding the model. These latter forces are an artifact of the test and would not be present during real-life operation. Hence, reducing the forces caused by vibrations of the support structure would improve the accuracy of the test. If these forces were too large they could even pose a danger to the model. Reducing them would allow the model to be tested under a greater range of conditions.

It is possible at steps 202 and 204 to select a mass and one or more springs so that the mass-damping apparatus has a natural vibration frequency in common with the support structure, or with the combination of the support structure and the model. Since the support structure is attached to the model, and the model is attached to the mass-damping apparatus at step 206, vibrations of the support structure may be transferred to the mass-damping apparatus instead of the model. Thus, tuning the mass-damping apparatus to the natural frequency of the support structure by appropriate selection of a mass and an effective spring constant reduces undesirable artifact forces on the model during testing.

In some cases, various steps in method 200 may be performed repeatedly. For example, after initial wind tunnel testing at step 210, step 208 may be repeated to adjust the flow of the damping medium through the passageway between the pressure chambers, and thereby to "tune" the mass damper to achieve better damping of the support structure vibrations. In other cases, it may be desirable or necessary to adjust the amount of mass and/or the spring constant of the mass damper after initial aerodynamic testing, i.e., to repeat one or both of steps 202 and 204 after performing step 210, to obtain a better match between the natural frequency of the mass damper and the natural frequency of the vibrations to be reduced. The various steps of method 200 may be repeated any desired number of times, to tune the mass damper repeatedly until the undesirable artifact vibrations are suppressed to a desired degree. This tuning process is also depicted in FIG. 6 and described in further detail below.

Figure 6:
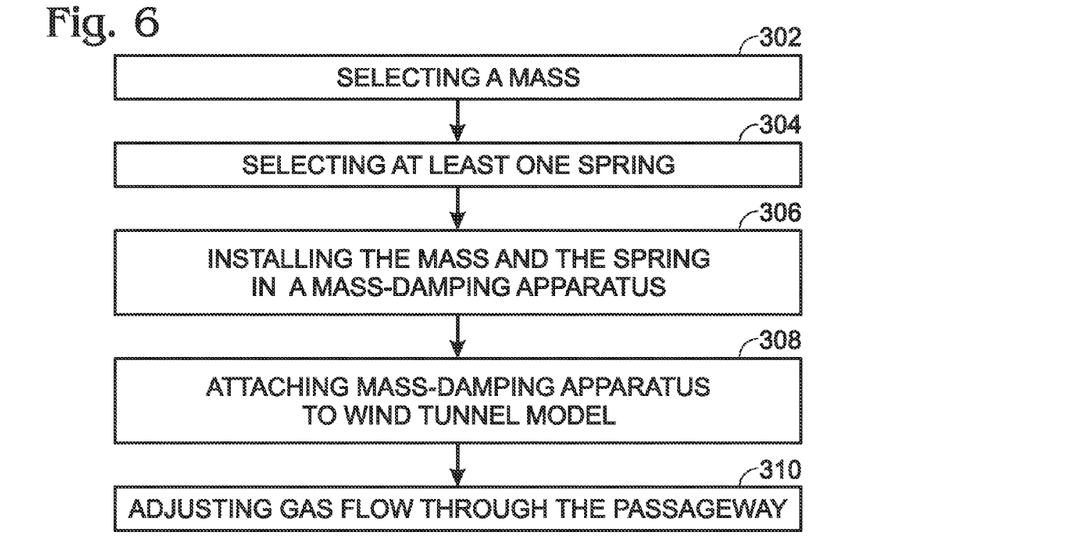
FIG. 6 is a flow chart depicting a method of tuning a mass-damping apparatus to reduce dynamic forces on a wind tunnel model during wind tunnel testing, according to aspects of the present disclosure.

FIG. 6 is a flow chart depicting a method, generally indicated at 300, of tuning a mass-damping apparatus to reduce dynamic forces on a wind tunnel model during wind tunnel testing, according to aspects of the present disclosure.

At step 302, a mass is selected. The mass may be chosen with weight equal to a predetermined percentage of weight of the wind tunnel model. For example, the chosen mass may have a weight in the range of 0.5-10 percent of the weight of the model, or in the range of 1-3 percent of the weight of the model.

At step 304, at least one spring is selected. The spring may have a spring constant chosen based on a natural frequency of the wind tunnel model and/or a support structure for the wind tunnel model. In other words, the combination of the selected mass and spring may be chosen to have a natural oscillation frequency equal to the natural frequency of vibrations to be reduced. When more than one spring is used, the springs may collectively have an effective spring constant that is chosen based on the natural frequency described above.

At step 306, the selected mass and spring(s) are installed in a mass-damping apparatus such as one of the mass dampers described previously in this disclosure. The apparatus may include first and second pressure chambers containing a gas such as atmospheric air. The pressure chambers may be defined by a housing that holds the selected mass and the at least one spring. For example, the mass may be received in a cylindrical central portion of the housing between the first and second pressure chambers.

The selected mass may be configured to move back and forth in this cylindrical central portion between the pressure chambers in a substantially airtight manner, thus altering the air pressure within each pressure chamber. As the mass moves back and forth, the spring(s) will exert a position-dependent force upon the mass. The apparatus may include a passageway configured to allow air or any other fluid medium to pass between the first and second pressure chambers. Flow through this passageway may be regulated by a valve that may, for example, include a plurality of apertures configured to be incrementally opened. The housing of the apparatus may include or define a mounting base as has been described previously.

At step 308, the mass-damping apparatus is attached to the wind tunnel model. The apparatus may be coupled to the wind tunnel model by many different means, including attaching the mounting base to the model via screws, bolts or the like. The wind tunnel model may be attached to a support structure and may include a number of sensors designed to measure forces acting on the model during testing. As described above with respect to method 200, some of these forces may originate from the aerodynamic performance of the model, and some may originate from the support structure itself.

At step 310, the flow through the passageway is adjusted. The air or other medium in the pressure chambers may provide a velocity-dependent damping force for the mass as it moves back and forth. By regulating the flow through the passageway, this damping force may be adjustable. For example, the aperture or apertures within the valve may be opened incrementally, thus regulating the amount of air that can flow through the passageway. The amount of damping in the mass-damping apparatus is thus tunable, for example to achieve maximum damping of undesirable vibrations resulting from the coupling of the model to its support structure.

The present teachings are intended to reduce forces resulting from vibrations of the support structure, so that actual aerodynamic forces on a model aircraft can be measured more accurately. By making appropriate choices for the mass at step 302 and the springs at step 304, the mass-damping apparatus may be tuned to a natural vibration frequency in common with the support structure or with the combination of the support structure and the model.

Such choices allow coupling of oscillation motion of the mass damper and the wind tunnel support, thus reducing non-aerodynamic forces on the model.

In addition, the damping force provided to the mass may be adjusted by regulating the air or other fluid flow within the passageway between the pressure chambers of the mass damper, for example to achieve maximum damping of vibrations at a particular frequency. A mass-damping apparatus according to the present teachings is thus tunable both in the sense that different masses and springs may be chosen to change the natural vibrational frequency of the mass-damping apparatus, and in the sense that the damping force can be conveniently adjusted to change the rate at which the mass damper reduces undesirable vibrations.

Figure 7:
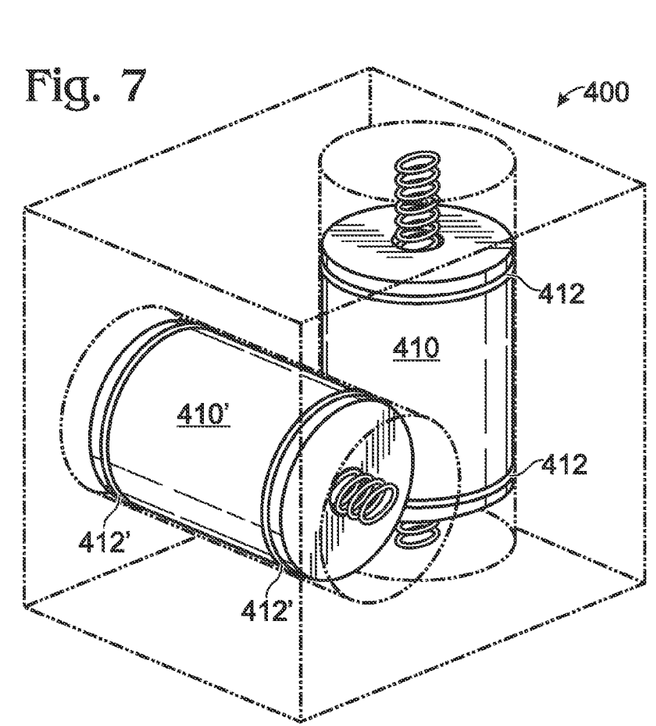
FIG. 7 is a schematic illustration of a multi-directional mass-damping apparatus, according to aspects of the present teachings.

FIG. 7 schematically depicts an embodiment of a multi-directional mass-damping apparatus, generally indicated at 400, according to aspects of the present teachings. Such an apparatus may be useful because the natural vibration frequencies of a wind tunnel model support structure, the model, or the support structure together with the model may be different in different directions. Further, a uni-directional mass-damping apparatus as described previously may have difficulty absorbing energy from side-to-side vibrations if the apparatus itself is oriented vertically. Apparatus 400 thus incorporates two mass dampers of the type described above, one oriented in a vertical direction as indicated at 410, and one oriented in a horizontal direction as indicated at 410'.

The two mass dampers incorporated into mass-damping apparatus 400 need not be identical. Indeed, the two dampers may be tuned independently as described in reference to FIGS. 5 and 6 to absorb energy at different frequencies and/or to dissipate the absorbed energies at different rates, thus further reducing dynamic forces on the model during testing. The two dampers may be oriented perpendicularly to each other, as depicted in FIG. 7, or at any other desired angle with respect to each other. In addition, the dampers may be oriented at any angle with respect to the model. In some cases, three dampers may be used to provide damping along three axes.

The individual mass dampers 410 and 410' each have a set of sealing members 412 and 412' disposed around the outer edges of the oscillating masses and making contact with the cylindrical central portions. The sealing members help to maintain an airtight seal between each mass and the surrounding cylinder as the masses move back and forth. It is also possible for masses to fit within a cylinder in a substantially airtight manner without sealing members, and any of the embodiments shown and described by the present teachings may or may not incorporate a set of sealing members in order to maintain an airtight seal. The sealing members may, for example, be rings made of Teflon, rubber, or any other suitable material. There may be one, two, or more than two sealing members disposed around the mass.

In the previous descriptions and drawings the use of terms such as "upper," "lower," "top," "bottom," "first," and "second" are meant to aid in the descriptions of the drawings and are not to be taken to be limiting in any sense, or to imply that the mass-damping apparatus can only be used in a vertical orientation. The embodiments of the mass-damping apparatus shown are illustrative of the principles of the invention and could be altered by a person with knowledge of the art.

What is claimed is:

1. A wind tunnel testing system configured to reduce vibrations of a wind tunnel model due to coupling of the wind tunnel model with a support structure, the system comprising:
   the wind tunnel model;
   a mass-damping apparatus coupled to the wind tunnel model, the mass-damping apparatus including:
      first and second pressure chambers containing a gas;
      a mass configured to move back and forth between the pressure chambers in a substantially airtight manner and thereby to alter gas pressure within each pressure chamber;
      at least one spring configured to exert a position-dependent force upon the mass; and
      a passageway configured to allow the gas to pass between the chambers; and
   the support structure connected to the wind tunnel model and configured to support the wind tunnel model within a wind tunnel during wind tunnel testing;
   wherein the spring is characterized by a spring constant chosen based on a natural frequency of the support structure, thereby to reduce vibrations of the wind tunnel model that arise from the coupling of the wind tunnel model with the support structure and to allow measurement of vibrations associated with the actual aerodynamic performance of the wind tunnel model.

2. The system of claim 1, further comprising a valve configured to control a rate of gas flow through the passageway.

3. The system of claim 2, wherein the valve includes a plurality of apertures configured to be incrementally opened as the valve is adjusted, thereby regulating gas flow through the passageway.

4. The system of claim 1, wherein the gas is atmospheric air.

5. The system of claim 1, wherein the at least one spring includes a first spring configured to exert a force upon a first side of the mass, and a second spring configured to exert a force on a second side of the mass substantially opposite the first side.

6. The system of claim 1, wherein the mass has a weight in a range of 0.5 to 10 percent of a weight of the wind tunnel model.

7. The system of claim 1, further comprising a housing that defines the first and second pressure chambers, a cylindrical central portion between the first and second pressure chambers for receiving the mass, and a mounting base configured to couple the housing to the wind tunnel model.

8. A method of reducing dynamic forces on a wind tunnel model during wind tunnel testing, comprising:
- selecting a mass with weight equal to a predetermined percentage of weight of the wind tunnel model;
- selecting at least one spring with a spring constant chosen (a) based on a natural frequency of a support structure for the wind tunnel model, in order to reduce vibrations of the wind tunnel model that arise from the coupling of the wind tunnel model with the support structure and (b) in order to preserve vibrations associated with the aerodynamic performance of the wind tunnel model;
- attaching to the wind tunnel model a mass-damping apparatus that includes:
  - first and second pressure chambers containing air;
  - the selected mass configured to move hack and forth between the pressure chambers in a substantially airtight manner and thereby to alter air pressure within each pressure chamber;
  - the at least one selected spring configured to exert a position-dependent force upon the mass; and
  - a passageway configured to allow the air to pass between the chambers; and
- performing wind tunnel testing upon the wind tunnel model.

9. The method of claim 8, wherein the mass-damping apparatus further includes a valve configured to regulate air flow through the passageway, and further comprising adjusting air flow through the passageway using the valve.

10. The method of claim 9, wherein the valve includes a plurality of apertures configured to be incrementally opened as the valve is adjusted, thereby regulating air flow through the passageway.

11. The method of claim 8, wherein the mass is selected to have a weight in a range of 0.5 to 10 percent of the weight of the wind tunnel model.

12. The method of claim 8, wherein the mass-damping apparatus includes a housing that defines the first and second pressure chambers, a cylindrical central portion between the first and second pressure chambers for receiving the mass, and a mounting base configured to couple the housing to the wind tunnel model.

13. The method of claim 8, wherein selecting at least one spring includes selecting at least two springs which collectively have an effective spring constant chosen to reduce motions of the wind tunnel model at the natural frequency of the support structure.

14. A method of tuning a mass-damping apparatus to reduce dynamic forces on a wind tunnel model during wind tunnel testing, comprising:
- selecting a mass with weight equal to a predetermined percentage of weight of the wind tunnel model;
- selecting at least one spring with a spring constant chosen to reduce vibrations of the wind tunnel model at a natural frequency of a support structure for the wind tunnel model;
- installing the mass and the at least one spring in a mass-damping apparatus that allows the mass to move back and forth between first and second gas-filled pressure chambers in a substantially airtight manner while the spring exerts a position-dependent force upon the mass and while gas passes between the chambers through a passageway connecting the chambers; and
- adjusting gas flow through the passageway to attain a desired degree of damping of the vibrations of the wind tunnel model that arise from the coupling of the wind tunnel model with the support structure while leaving unclamped the aerodynamic vibrations of the wind tunnel model.

15. The method of claim 14, further comprising attaching the mass-damping apparatus to the wind tunnel model.

16. The method of claim 14, wherein the gas is atmospheric air.

17. The method of claim 14, wherein adjusting gas flow is performed with a valve that includes a plurality of apertures configured to be incrementally opened as the valve is adjusted, thereby regulating gas flow through the passageway.

18. The method of claim 14, wherein the mass is selected to have a weight in a range of 0.5 to 10 percent of the weight of the wind tunnel model.

19. The method of claim 14, wherein the mass-damping apparatus includes a housing that defines the first and second pressure chambers, a cylindrical central portion between the first and second pressure chambers for receiving the mass, and a mounting base configured to couple the housing to the wind tunnel model.

20. The method of claim 14, wherein selecting at least one spring includes selecting at least two springs which collectively have an effective spring constant chosen to reduce motions of the wind tunnel model at the natural frequency of the support structure.

* * * * *